Patented Mar. 20, 1945

2,371,688

UNITED STATES PATENT OFFICE 2,371,688

MOLDING COMPOSITION

Jacob D. Gold, Brooklyn, N. Y.

No Drawing. Application August 27, 1942,
Serial No. 456,363

10 Claims. (Cl. 18—47)

The present invention relates particularly to an improved molding composition whereby finished molded articles may be obtained with a reduced amount of labor and with a highly satisfactory surface finish.

More specifically, my invention relates to an improved molding composition for use in processing objects made from synthetic resin compositions, such as methyl methacrylate, which is cured by hot water at temperatures up to the boiling point of water.

The present invention is of particular advantage in the form of a dental investment composition for use in making of dentures having a thermoplastic or thermo-setting resinous base, and the invention will accordingly be described more in detail in connection with the manufacture of dentures, although the composition is of general application in the molding art.

In the preparation of dentures, it is customary to make a trial base out of a fusible wax composition or to use a shellac base plate upon which there are set the teeth and other appurtenances for the denture with the aid of dental wax. This "positive" of the patient's gum with the teeth anchored therein is known as the "case" and I shall refer to it hereinafter by such name.

If the case is of the type that is known as a metal base with acrylic or other resin attachment, it is common to use wax to attach the teeth thereto until they can be "tried in," and then transferred to the investment for the finishing with the selected material. Whatever the method employed for making the case, wax is used in the "setting up" of the denture.

When the case is ready for processing, it is usually put in the lower half or drag of the flask. Following this, it is customary to cover the wax or wax and shellac surfaces with tin foil prior to the pouring of the investment.

The tin-foiling of the wax model is objectionable not only because of the scarcity of the tin foil at the present time, but also because of the great amount of time consumed in its proper application. Also as it is well known, the plaster of Paris which is used for the processing or investing of the case becomes much harder during this procedure and thus when the case is ready for separation or removal from certain types of flasks now in use quite a bit of digging is required to release it.

When the processor of the case does not foil it before pouring the investment thereon and then introduces the resin into the unfoiled mold and cures it, there is a strong likelihood of blanching of the color of the resin case together with permeation or penetration of the resin into the plaster used for the investment. These color mottles or blanches made the denture unsightly and thus not generally acceptable to the profession. The penetrations of resin into the plaster introduce serious difficulties and they are hard and sometimes impossible to remove without ruining the case. It is for this reason that tin foiling is quite generally resorted to as a protective coating against which the resin is pressed and cured. The tin foiling is usually carried out by pressing the foil onto the wax of the case, being sometimes cemented to the wax and being burnished to insure a close and true application with a continuously smooth surface as is familiar to those skilled in this art. Then the top of the flask is put in place, the investment is poured therein and the cover put on. When the investment is properly set, the flask is then heated by means of hot water to aid in the separation. The flask case is then washed out to remove residues of wax by means of hot water. The foil is then left affixed to the investment in the upper part of the flask.

In place of foiling, there is sometimes used a separator in the form of a solution of sodium silicate or of cellulose acetate. The separator is painted on the investment after the removal of the wax mold. This separator, however, is not very efficient and great care must be exercised to keep it away from the pins and necks of the teeth and from other attachments that are to be embedded in the final case. This careful treatment consumes much time and is objectionable also because of the danger that the separating material may get onto the said forbidden portions of the case and thereby create the likelihood that the covered object will work loose from the denture by reason of such intervening film of separator. Also, there is the danger of touching teeth and other parts so that the tendency is not to apply the separator too close to such parts, particularly at the proximal contact of the teeth; as a result, there is left uncoated plaster at these points which usually permits embedding or penetration of resin with resulting loss of time in attempts to remove the same.

According to the present invention, there is provided a molding composition suitable for use as an investment material in dentistry as well as in related molding fields and possessing valuable advantages in processes involving the manufacture of a relatively rigid mold embodying a positive impression of the object to be reproduced and made, for example, by preparing a fusible wax mold and surrounding the same with an investment material in a suitable flask, followed by removal of the wax mold by heating and washing out with hot water. The investment molding composition of the present composition is of such character that the need for tin foiling on the investment side is completely eliminated while at the same time, true, smooth, and relatively nonporous surfaces in the final object are secured. The new composition is further characterized by the feature that it does not become harder when it is put through the process of hot water curing at boiling or approximately boiling temperatures. These and other advantages of the invention will become clear as the description of the specific nature of the composition proceeds.

The base of my improved molding composition is composed essentially of ordinary slow setting gypsum or plaster of Paris and to this base, I add certain substances, described more fully hereinafter, which modify its character in such a way that molding processes generally, and denture manufacture particularly, are greatly simplified and the use of special separating media such as tin or other foil, sodium silicate, cellulose acetate, and the like, is eliminated.

To prevent penetrating adhesions and make for ease of separation of the cured denture from the investment surrounding it, I have taken advantage of the fact that the de-waxing process (melting out the wax) is the prime condition established before the packing with the resin can take place. This de-waxing is effected by first placing the flask with the invested case in either hot or boiling water and leaving it long enough for the wax to melt so that the two parts of the flask can be separated, leaving the fixed objects and teeth in the side of the case as conditions dictate. This is usually, in the case of teeth, on the investment side. I have found that by including an emulsifier or saponifier in the plaster of Paris or calcined gypsum, the melting wax is caused to form a film upon the plaster surface which contains such emulsifier or saponifier. I have found further that the process of washing with hot water to effect removal of the residue of the wax out of the case promotes the formation of this film. This film acts as a lubricant and surface film which prevents the resin from adhering to the plaster and from penetrating into the same so that the separation of the two at their contacting surfaces is made quite easy.

I have found that alkylolamine having an emulsifying and/or saponifying action are highly suitable for the purpose of view, and among these tri-isopropanolamine to be highly satisfactory. This substituted amine can be incorporated in the gypsum powder in a relatively small amount and yet be highly effective. While not limiting myself to any specific amount, I have found that as little as one part of alkylolamine in 1000 parts of gypsum powder will be satisfactory. A preferred ratio is about 1 to 440. With some grades of gypsum, optimum results will be obtained with a somewhat higher proportion of the amine, and the best proportions can be determined by experiment.

While the emulsifier will prevent the penetration of the resin into the investment, it will not entirely prevent the blanching or serious lightening of the color or the resin; neither will it bring about the proper softening of the investment after the hot water treatment for curing the resin. In a further development of the invention, I include in the investment composition a material which will bring about color evenness. Such evenness I effect by the use of a water soluble alkyl cellulose ether such as methyl or ethyl cellulose. The methyl cellulose, for example, is obtained in a finely comminuted state, and is mixed with the dry calcined gypsum. The alkyl cellulose ether will not only help to produce color evenness but will also help to prevent investment hardening after the curing process and will aid in preventing serious penetration when the de-waxing process or the conditions created by the boiling to effect de-waxing destroys some of the emulsifier referred to above.

The alkyl cellulose ether can be used in solution in the water used for mixing the plaster slurry; the emulsifier can be incorporated in similar fashion. I have found it, however, to be more practical to incorporate the dry ingredients (the emulsifier and the alkyl cellulose ether) directly into the powdered calcined gypsum and the mixture packaged in the dry condition. In this way, proper proportions of the ingredients will be insured and the danger of inaccurate compounding will be eliminated.

The proportion of methyl cellulose will vary with the viscosity of the solutions which the grade used will make. In other words, it will vary with the centipoise factor of the grade. For practical purposes, and since it happens that the lowest grade viscosity at present on the market (15 centipoise) comes in a nearly ready made condition (sifting for removal of coarse particles being necessary) to make it suitable for mixing with powdered calcined gypsum, I have found this lowest viscosity grade in the proportion of ½ to 2% to be highly satisfactory. The particular proportion employed will depend somewhat upon the proportions of the other ingredients and the type of calcined gypsum used.

It sometimes happens that under practical conditions of de-waxing or washing out of the case, the layer or film that protects the resin from color-lightening is not formed or not to a sufficient degree. To prevent this from occurring and thereby promote color stabilization, I add a small quantity of a high melting wax, such as carnauba wax. This wax is not absolutely essential to the formula, but its addition is recommended to guard against careless de-waxing or too vigorous a cleaning out of the last traces of wax from the investment. The added high melting point wax will become effective especially when, by some mischance, the investment is not fully bathed in the melting wax, so that the required reaction will not take place at certain areas with the emulsifier embodied in the investment composition. In such event, the high melting point wax will, when the case is being de-waxed and washed out, be drawn to the surface by the hot wash water, and the film will then be formed which prevents penetration by the resin and discoloration of the latter. The amount of carnauba or similar high melting wax is very small, say about 1 part in 1000; the amount, however, can be increased or decreased without altering essentially the character of the composition.

To this mixture so far described, there may be added a metallic soap such as calcium or zinc stearate. This addition appears to contribute to the results above described. It can be incorporated as a powder with the calcined gypsum and is used in proportion of approximately 1:1000.

The following formulas have been found by me to give satisfactory results:

Example 1

| | Parts |
|---|---|
| Calcined gypsum | 100 |
| Water soluble methyl cellulose (finely powdered and of the lowest viscosity rating) | 0.50 to 2.00 |
| Tri-isopropanolamine | 0.20 to 0.33 |

If carnauba wax is used, it can be employed in the same proportion as the tri-isopropanolamine. The amount of total powder mix used is generally about the same as is used to make any other plaster slurry for the investing of dental objects or dentures, namely, about 100 parts of plaster mix to 60 parts of water. In mixing the slurry for the investment, it is better first to make a small amount of mix that is slightly richer than just indicated, for example about 120 parts of plaster to 60 of water. This is painted on with a brush or smeared on directly to the wax of the mold, care being taken that no air bubbles are formed, and then the balance of the flask is filled with a mix made from the balance of the powder measured for the size of the flask used. The initial and final proportions of plaster mix to water are best determined by need for speed for the completion of the case. Much will depend upon how soon the case is to be completed. If there is need for speed, then a richer mix is made as less time will then be needed for firm setting of the plaster of the investment.

Example 2

| | Parts |
|---|---|
| Calcined gypsum | 100 |
| Water soluble methyl cellulose | 0.50 to 2.00 |
| Tri-isopropanolamine | 0.20 to 0.33 |
| Calcium stearate | 0.05 to 0.1 |

(All parts are by weight.)

The various mixtures may be produced in the following manner: The alkyl cellulose ether is produced in the form of fine powder and is thoroughly mixed with most of the gypsum. Tri-isopropanolamine is rubbed up dry with some of the remaining gypsum and ground and sifted to a fine powdery mix. Both of these preparations are then thoroughly mixed. Any other ingredient that is used is also mixed directly with a portion of the gypsum and is then combined with the other mixtures.

Prior to the introduction of the resin into the investment, the wax should be completely melted out and the directions of the manufacturer of the particular resin employed should be followed. It is advisable not to use acetone or chloroform or other organic solvents to clean off the teeth unless the latter are again thoroughly washed with hot water. To remove any remaining wax, adhering to the teeth or other fixtures of the case, it is advisable to use only a soap solution with some of the hot water, followed by a washing with clean hot water. Soapy hot water may be used throughout for a wash, if it is not too strong.

It is to be noted that the tri-isopropanolamine acts also as a wetting agent, and thereby helps the formation of the slurry, which might otherwise be retarded by the methyl cellulose ether particles. It appears further that the amine prevents adhesions by operating as a film-former for the surface of the investment. The methyl cellulose ether, on the other hand, fills the pores of the investment and prevents penetration by the resin into the plaster.

I claim:

1. A molding composition suitable for use as an investment in the manufacture of dentures and comprising calcined gypsum and a relatively small proportion of an alkylolamine and water soluble alkyl cellulose ether.

2. A molding composition suitable for use as an investment in the manufacture of dentures and comprising calcined gypsum and a relatively small proportion of an alkylamine substance comprising short chain members of the aliphatic series and a water soluble alkyl cellulose ether.

3. A molding composition suitable for use as an investment in the manufacture of dentures and comprising calcined gypsum and relatively small proportions of tri-isopropanolamine and water soluble methyl cellulose.

4. A molding composition suitable for use as an investment in the manufacture of dentures and comprising calcined gypsum and relatively small proportions of an alkylolamine and a high melting point wax.

5. A composition as defined in claim 4, wherein the wax is carnauba wax.

6. A molding composition suitable for use as an investment in the manufacture of dentures and comprising gypsum, and alkylolamine and a metal soap.

7. A composition as defined in claim 6, wherein the metal soap is calcium stearate.

8. An investment composition for use in the manufacture of resin base dentures and characterized by the capacity for forming a protecting film on removal of the wax mold whereby penetration by the resin is prevented without the intermediary of metallic or other separately applied films comprising a calcined gypsum, a relatively small proportion of a lower tri-alkylolamine, a lower water soluble alkyl cellulose ether and a high melting point wax.

9. An investment composition for use in the manufacture of resin base dentures and characterized by the capacity for forming a protecting film on removal of the wax mold whereby penetration by the resin is prevented without the intermediary of metallic or other separately applied films comprising a calcined gypsum, a relatively small proportion of a lower tri-isopropanolamine, and a color evener for the resin in the form of a lower water soluble alkyl cellulose ether.

10. An investment composition for use in the manufacture of resin base dentures and characterized by the capacity for forming a protecting film on removal of the wax mold whereby penetration by the resin is prevented without the intermediary of metallic or other separately applied films and characterized further by the capacity for protecting the resin surface against blanching, comprising approximately 100 parts of calcined gypsum, 0.50 to 2.00 parts of methyl cellulose and 0.20 to 0.33 part of tri-isopropanolamine.

JACOB D. GOLD.